United States Patent [19]

Sheeter

[11] Patent Number: 5,265,546
[45] Date of Patent: Nov. 30, 1993

[54] AUTOMATIC PLANTING APPARATUS AND PROCESS

[76] Inventor: Eric Sheeter, C. 22 Beaver Point Road, R.R. 1, Fulford Harbour, Canada, V0S 1C0

[21] Appl. No.: 776,243

[22] PCT Filed: Mar. 12, 1990

[86] PCT No.: PCT/GB90/00369
§ 371 Date: Nov. 8, 1991
§ 102(e) Date: Nov. 8, 1991

[87] PCT Pub. No.: WO90/10374
PCT Pub. Date: Sep. 20, 1990

[30] Foreign Application Priority Data

Mar. 10, 1989 [GB] United Kingdom ............... 8905470

[51] Int. Cl.⁵ .................................................. A01C 11/02
[52] U.S. Cl. .................................... 111/101; 111/102; 111/115
[58] Field of Search ............... 111/100, 101, 102, 106, 111/108, 114, 115, 117

[56] References Cited

U.S. PATENT DOCUMENTS

| | | | |
|---|---|---|---|
| 4,832 | 3/1872 | Fuller | 111/106 |
| 134,775 | 1/1873 | Stanton et al. | 111/106 |
| 516,274 | 3/1894 | Morgan | 111/101 |
| 2,216,720 | 10/1940 | Cousins | 111/108 |
| 3,972,294 | 8/1976 | Grundstrom et al. | 111/115 |
| 4,790,400 | 12/1988 | Sheeter | 180/8.6 |

FOREIGN PATENT DOCUMENTS

| | | | |
|---|---|---|---|
| 637693 | 2/1928 | France | |
| 2498045 | 7/1982 | France | 111/115 |
| 395038 | 8/1973 | U.S.S.R. | 111/101 |
| 854301 | 8/1981 | U.S.S.R. | 111/115 |
| 865175 | 9/1981 | U.S.S.R. | 111/115 |
| 90/10373 | 9/1990 | World Int. Prop. O. | |

Primary Examiner—Randolph A. Reese
Assistant Examiner—Spencer Warnick
Attorney, Agent, or Firm—Ostrolenk, Faber, Gerb & Soffen

[57] ABSTRACT

Apparatus for planting seedlings, especially tree seedlings is described. A plant (32) is held in space (26) between two plates (23) and (24) whose lower edges are in mutual contact and form a cutting edge (25) which on downward movement penetrates the ground and an opening of its lower edges forms an excavation in which the plant is supported by means (33) and (34) while the plates are upwardly retracted.

20 Claims, 3 Drawing Sheets (a)

(b)

(c)

(d)

(a)

(b)

AUTOMATIC PLANTING APPARATUS AND PROCESS

The present invention relates to a process of planting tree seedlings and other plants and plant cuttings and an apparatus suitable for carrying out the process.

There are various types of apparatus for planting tree seedlings having varying degrees of automation. One experimental system utilises a rigid container which surrounds the tree roots and which has a pointed lower end. The trees are grown in the package. The "bullet" container is punched into the ground where it remains in place. The concept however required the use of relatively expensive materials for the container. The requirement for a strong package capable of being punched into the ground and the biological requirements for a package after planting, to allow the roots of the tree to grow normally have not been satisfactorily combined. The method is inherently suitable for one specific type of package and thus lacks flexibility. For these reasons the system is not entirely satisfactory and has not become commercially successful.

Another experimental system for spot planting of tree seedlings is the "friction differential dibble concept". In this system a seedling is held between a pair of plates, one of which has a smooth surface with a low coefficient of friction and the other of which has a rough surface with a high coefficient of friction (the "friction plate") in contact with the seedling. An excavation is made in the ground, usually by a rotating tool, and then the plates, held substantially parallel with the tree between them, are lowered into the excavation. The smooth plate is then moved vertically upwards, leaving the friction plate in the excavation. The friction plate acts to retain the seedling in the ground. Once the smooth plate is clear of the seedling the friction plate is moved upwards, the tree being held in the ground by the soil which can now contact the roots and has a higher coefficient of friction than the friction plate. This type of apparatus requires a separate cultivating tool. It it suitable only for use in well cultivated soil and is unsuitable for planting packaged root seedlings. In rough conditions the edges of the plates can become battered and turned and cannot function.

Systems with some degree of automation exist which operate on the principle of the tobacco transplanter, which was originally designed for manual operation. A tobacco transplanter consists of two plates which are held so that their lower edges form a cutting edge. These plates are thrust into the ground, the lower edges are pushed apart to form an excavation in the ground. A plant is then dropped between the opened plates and the plates are removed vertically to clear the ground and the plant. At least one apparatus exists having some degree of automation and having means for automatically dropping or blowing the plant down into the excavation made by the plates. One problem with these types of tools is that in order to ensure that the plants, and in particular bare root plants, drop to the bottom of an excavation, the hole must be relatively large. Although this enables the plates to be lifted clear of the ground and the seedling, it leaves a large excavation which requires to be closed. The existing systems are capable of handling a limited range of packaged root seedlings only, and even those are not planted with adequate consistence with these devices.

FR-A-637693 discloses an automated planting device wherein a planting head containing a plant is lowered into the ground and its plates open forming an excavation into which the plant is subsequently released and held by forked means while filling in of the excavation takes place.

Other planting processes exist which involve the formation of a continuous or intermittant furrow, into which a seedling can be placed by hand, or sometimes, by some type of automated feed mechanism, and the furrow is then closed. Such devices invariably require some manual feed operations, demand more power for turning up the ground than spot planters and cannot work in typical logged ground because of the presence of stamps and root systems of felled trees and thus require heavy machine clearance.

Other automated planting apparatus which may be suitable for planting packaged root trees have been developed, but these are in general unsuitable for handling bare root trees. Since in the main forestry areas, in particular in Scandinavia and North America, there is common use of bare-root seedlings and packaged root seedlings, it would be desirable to provide an automated planting system capable of handling the full range of both bare root and packaged root seedlings and which is capable of working in a variety of environments, including on uncultivated ground with obstacles.

According to the present invention a new process for planting a seedling comprises holding two plates so that their lower edges are in mutual contact and form a cutting edge, moving the plates simultaneously downwards to penetrate the surface of the ground with the cutting edge, opening the lower edges of the plates to form an excavation in the ground, positioning a seedling plant between the plates in the excavation, raising the plates to move them clear of the ground, closing the excavation around the roots of the seedling, and the process is characterised in that the seedling is supported in the excavation by holding means whilst the plates are raised and whilst the excavation is closed.

In this specification the term "seedling" encompasses tree and other plant seedlings, as well as plants and plant cuttings.

In a preferred process there is a space defined between the plates above the cutting edge and a seedling is placed in that space before the downward movement of the plates and is held in the space during the downward movement. Such a process allows the planting of a variety of seedling types, including bare root seedlings and avoids the difficulties with dropping bare root and other seedlings into excavations such as the difficulty of ensuring the plant is vertical and the usual necessity of subsequent rearrangement of the seedling. It is alternatively possible, but less preferred, to open the excavation by separating the lower edges of the plates and then to lower the seedling into the excavation.

In the process the excavation is closed around the roots of the plant. This is preferably carried out by injecting material into the excavation, either as a dry particulate material eg a powder or as a paste or slurry or even in sheet form A paste or slurry may be extruded through an orifice or orifices attached to one or more of the plates, usually to its inside surface. The fill may be injected as the plates are removed or after the plates have been lifted clear of the ground.

In an alternative method of closing the excavation a pair of blades are inserted into the ground on opposite sides of the seedling and spaced from the seedling at a greater distance than the edge of the excavation formed by the plates. Then the lower edges of the blades are moved simultaneously towards the plant. This shifts the soil towards the seedling. The blades that are used may be the plates used to create the excavation.

In a preferred process the seedlings include tree seedlings and more preferably include bare root seedlings and optionally also packaged root seedlings. Preferably both bare root and packaged root seedlings are planted.

Preferably in the process the seedlings are supplied mechanically from a storage area although they may be hand fed.

In the invention there is also provided a new planting device suitable for planting seedlings comprising a pair of plates capable of being supported to form a cutting edge by holding their lower edges in mutual contact, means for moving the plates downwards so that the cutting edge penetrates the ground, means for moving the plates apart to separate the lower edges to form an excavation in the ground, means for moving the plates upwards clear of the ground with the plates in their separated conformation and closing means for closing the excavation characterised by comprising also seedling holding means which are capable of holding the seedling in position in the excavation between the plates whilst the plates are moved upwards relative to the seedling and the ground and whilst the closing means operate to close the excavation around the roots of the seedling.

In a preferred form of the device the holding means are capable of holding the seedling in a space defined between the plates above the cutting edge during the downward movement of the plates and penetration of the ground. In such a device the preferred process in which the seedling is held between the plates as they are moved downwards to penetrate the ground can be carried out.

The plates may be essentially straight or they may be curved, to provide a space in which the seedling may be held.

The apparatus comprises means for subsequently closing the excavation around the seedlings roots. The preferred means for closing the excavation comprises fill injection means, for instance suitable for injecting dry particulate matter or for extruding a paste or slurry of the fill material into the excavation, such means are preferably provided on the inner surface of one or more plates, since in such a position the orifice or orifices are protected from plugging with soil during ground penetration.

Alternatively or additionally such means may comprise blade means which are capable of being held apart at a distance greater than the separation of the edges of the excavation and of being moved downwards to penetrate the ground on opposite sides of the excavation and the device comprises means for moving the blades simultaneously towards the excavation to close it. The blade means may be the plates used to create the excavation.

The process and apparatus of the invention are a development of the tobacco transplanter described above. They are, however, able to plant both bare root seedlings and packed root seedlings and to be fed seedlings by automatic feed means. The provision of the means for holding the plant during removal of the plates from the ground ensures that the seedling remains in the desired position and is not pulled out of the excavation by removal of the plates. Subsequent rearrangement of the planted seedling is not required. In the preferred embodiment of the invention of which the seedling is held between the plates during the initial downward movement the size of the excavation which requires to be made is minimised, placement of roots or root packs into the excavation ceases to be a problem, and the subsequent closure operation is easier. Furthermore the use of mechanical holding means allows the apparatus to be incorporated into a fully automated planter vehicle with automated feed from a storage area. An automated feed and storage system is described in copending application number PCT/GB90/00368 (WO 90/0373) filed even date herewith.

The invention is further illustrated in the accompanying drawings in which:

FIGS. 1a to d show in diagrammatic form the sequence of events from the initial lowering of a planting tool into the ground to the raising of the tool and releasing of the seedling;

FIGS. 2a and b show the sequence of events in the closing an excavation;

Figure 1:
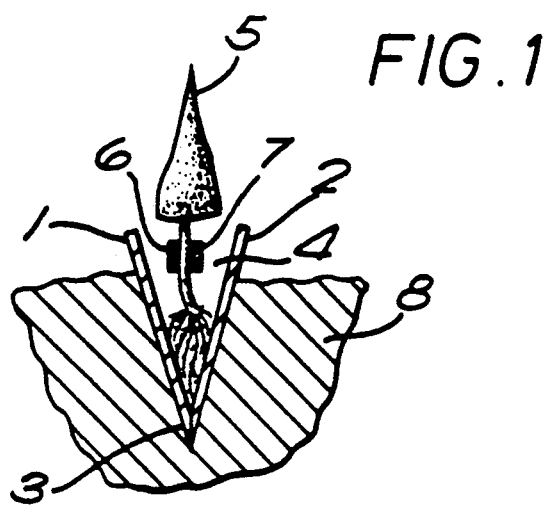
Figure 1:
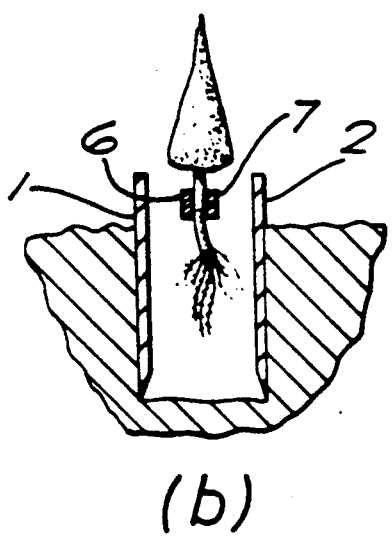
Figure 1:
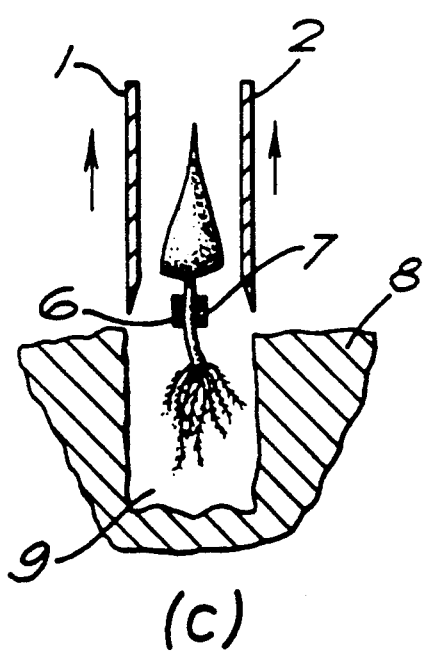
Figure 1:
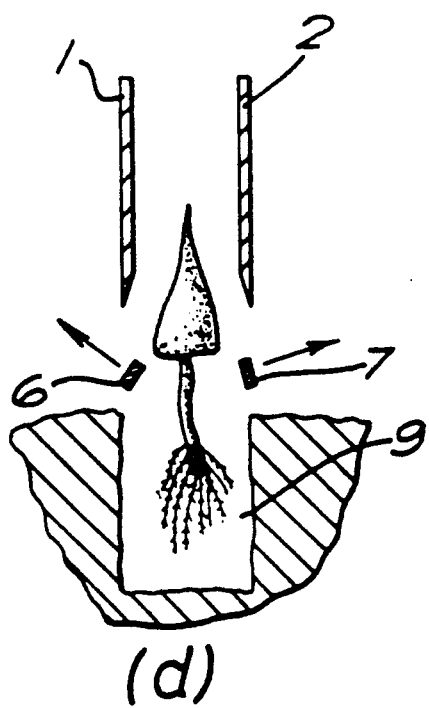

With reference to FIG. 1, there is shown in diagrammatic form parts of a planting device according to the present invention and the sequence of movements of the plates of such a device for planting a seedling. Thus the device consists of plates 1 and 2, which are substantially straight but could alternatively be curved to surround all sides or three sides of the space. The plates are supported to form a cutting edge 3 where their lower edges contact each other and to define a space for above the cutting edge between the plates. In this space a seedling 5 is held by grippers 6 and 7 which grip the seedling stems. During the initial lowering of the device into the ground, which is not shown in the diagrams, the seedling is held in position between the plates as they penetrate the ground. The cutting edge 3 penetrates the ground 8 to form an excavation bounded by the plates. In the next step of the sequence, the plates 1 and 2 are manipulated so as to separate their lower edges. The plates are consequently substantially parallel to each other and held substantially vertically in the ground. During this step the seedling is still being held by the grippers 6 and 7.

In the next step of the sequence, the plates are simultaneously moved upwards, in the direction indicated by the arrows in FIG. 1c to move clear of the ground. During this step the seedling is still held within the excavation 9 which has been left by the plates, by the grippers 6 and 7. In this way the seedling is not pulled out of the excavation by contact with the plates as they are raised. The plates are raised so that they are clear of the grippers and then, as shown in FIG. 1d, the grippers release the seedling by being moved in the direction of the arrows in FIG. 1d. The seedling is thus left in the excavation 9.

Figure 2:
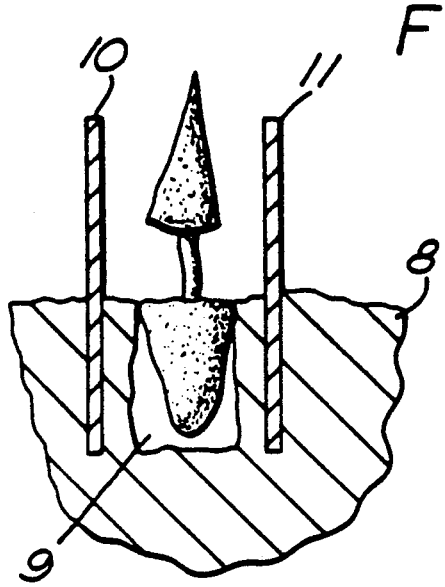
Figure 2:
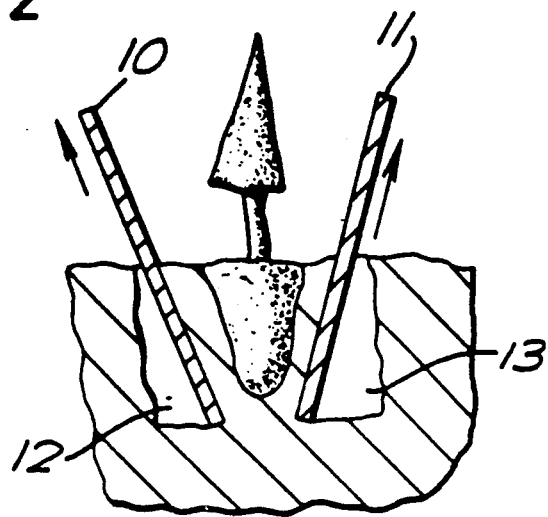

Although the excavation 9 could be closed by hand, it is preferably closed mechanically by the sequence shown in FIG. 2. In FIG. 2 a seedling having a conical root package is illustrated, although of course the process would be equally useful for a bare root seedling of the type illustrated in FIG. 1. In FIG. 2a blades 10 and 11 are lowered into the ground 8 on opposite sides of the planted seedling and beyond the edges of the excavation 9. When the blades 10 and 11 have been lowered to the approximate depth of the excavation, their lower edges are pushed inwards towards the roots of the seedling, to close the excavation. As can be seen from FIG. 2b, the inward movement of the lower edges of the blades 10 and 11 closes the excavation by pushing soil into the empty parts of the excavation. This leaves hollows 12 and 13 outside the blades, which are unlikely to effect the seedling which is now tightly held by the soil surrounding it. The blades 10 and 11 are then removed from the soil, preferably by moving in the direction of the arrows shown in FIGS. 2b, so as to cause as little disturbance to the roots as possible.

There may be a subsequent closing step, in which the blades 10 and 11 are again lowered into the ground whilst in a substantial vertical orientation and separated further from the seedling than in the first closing step. The blades can then be manipulated as illustrated in FIG. 2 to provide a further closing around the roots.

Figure 4:
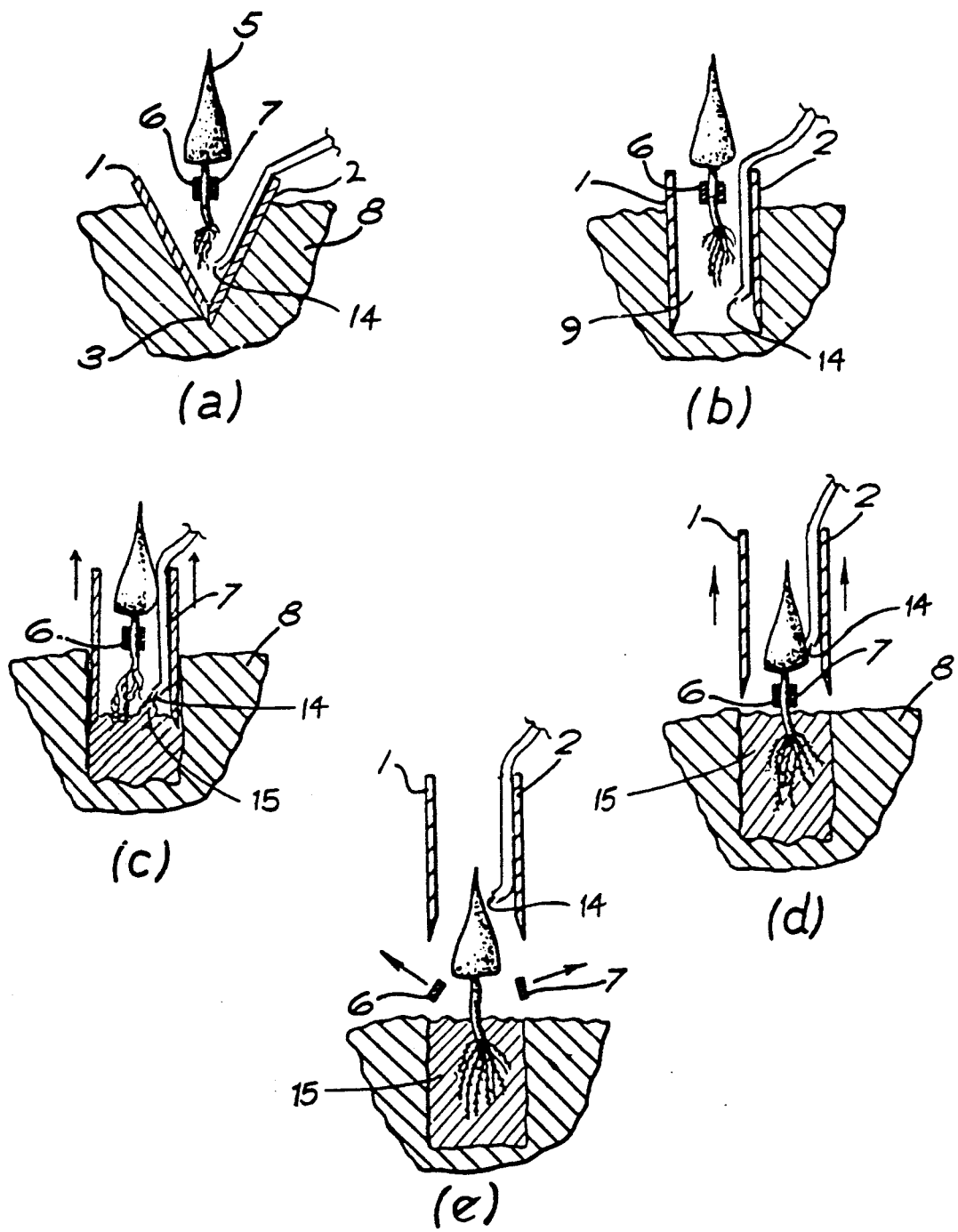
FIGS. 4a–4e show in diagrammatic form a second sequence of events from the initial lowering of a planting tool into the ground to the raising of the tool and releasing of the seedling.

An alternative, often preferred, method of closing the excavation includes the injection of back fill material, e.g. soil, into the excavation, either dry or as a paste or slurry. Such material may be extruded through orifices 14, preferably provided on the inner surfaces of the plate 1 and/or the plate 2. The back fill 15 may be injected after removal of the plates from the excavation, for instance between steps c and d of FIG. 1, or, preferably, the back fill is injected during the plate removal step, i.e. during step c of FIG. 4.

Figure 3:
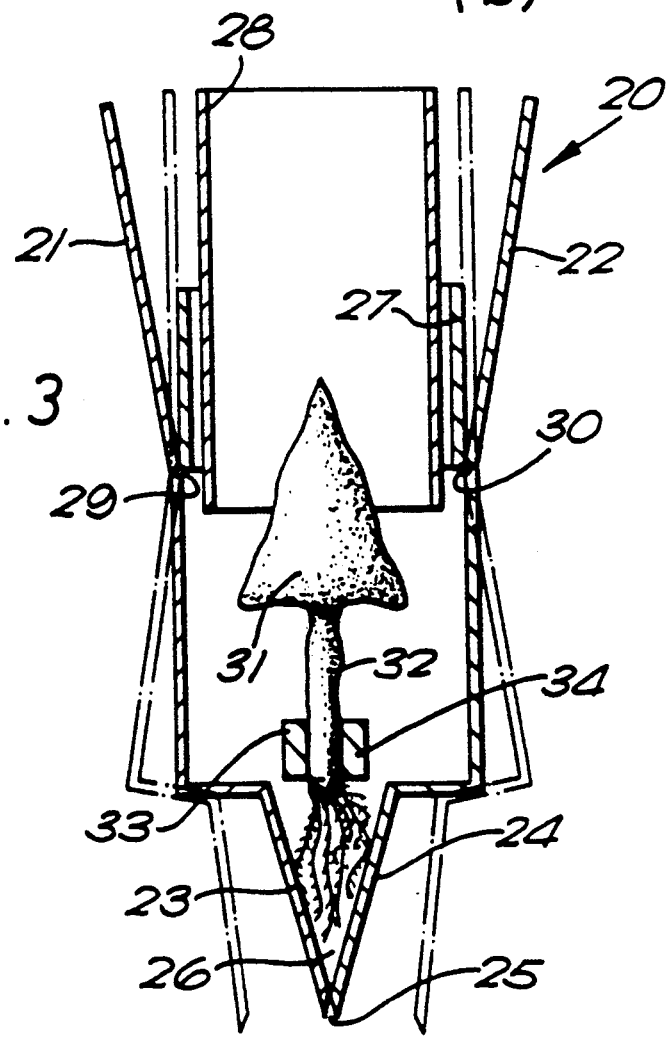
FIG. 3 shows a section through a planting tool according to the invention.

FIG. 3 illustrates in more detail one embodiment of the device according to the invention. The device 20 comprises a pair of plates 21 and 22. These are shaped so that at their lower portions, 23 and 24 they are positioned so that their lower edges are in contact to form a cutting edge 25 and above the cutting edge a space 26, in which the roots of a seedling to be planted may be contained. The device comprises also a collar 27 mounted on and vertically slideable along a frame 28. The plates 21 and 22 are fixed to the collar via hinges 29 and 30, respectively. Sliding the collar 27 along the frame 28 causes vertical movement of the plates 21 and 22 relative to the frame 28. The hinges 29 and 30 allow the plates to be moved from the closed position illustrated in FIG. 3 to an open position illustrated by the broken lines in FIG. 3, in which the upper ends of the plates 21 and 22 are moved inwards and the lower portions 23 and 24 of the plates are moved away from each other. The lower portions 23, 24 of the plates are substantially parallel with each other in the fully open position.

A seedling 31 is held by its stem 32 between a pair of grippers, 33 and 34. These grippers are capable of movement, by means not shown, vertically with the frame 28, and thus are capable of vertical motion relative to the plates 21 and 22. The grippers 33 and 34 are furthermore capable of releasing the seedling stem 32 when the plates are in their open position after they have been raised clear of the grippers.

To use the device illustrated in FIG. 3, with the seedling held in the position shown in FIG. 3 and with the plates in the closed position as shown, the entire device is lowered so that the cutting edge 25 penetrates the ground until the seedling is in the desired position within the excavation that has been formed. The plates 21 and 22 are then opened by rotating them about hinges 29 and 30 to the fully open position, shown by the broken lines in FIG. 3. Whilst maintaining the frame 28 and consequently grippers 33 and 34 in the same position, the collar 27 is then moved upwards on the frame to withdraw the plates 21 and 22 from the ground. The collar 27 and plates 21 and 22 are moved upwards until the bottom edges of the plates 23 and 24 are raised clear of grippers 33 and 34. The grippers 33 and 34 are then moved outwards to release the stem 32 of the seedling and leave it planted in the excavation that has been made by the plates.

The excavation can subsequently be closed, by the mechanism shown in FIG. 2a and b, using a pair of independent blades, which are not illustrated, and which are capable of being held apart at a greater distance than the plates 21 and 22 at their widest open position.

The seedlings are preferably fed to the planting device automatically, although they may be hand fed to the grippers 33 and 34. An automated feeding mechanism preferably conveys the seedlings already held between the grippers 33 and 34 which are to support the seedling in the device, from a storage area to the device. Alternatively an automated feeding mechanism may convey seedlings to grippers 33, 34 which are mounted on the planting device and transfer the seedlings one by one to the grippers. Suitable constructions for such storage and conveying devices are described and illustrated in my co-pending application (reference no. 62/2086/01) filed even date herewith, the disclosure of which is herein incorporated by reference.

The planting device is suitably mounted on a vehicle suitable for travelling over ground to be planted, and may thus be mounted on wheeled vehicles with conventional steering or with skidder-type steering, or may be mounted on a stepping vehicle for instance of the type described in my earlier publication EP-A-0257791. The vehicle may carry several planting devices which can be used simultaneously. The vehicle may move intermittently between adjacent planting sites or in easy conditions may move continuously with the planting devices mounted so that they can remain fixed relative to the ground during each planting operation. A vehicle of the type described in EP-A-0257791 is particularly convenient as it can easily be caused to move in an intermittent fashion which is convenient for spot planting as described herein, and is highly maneuverable and able to pass over substantial obstacles.

I claim:

1. A process for spot planting a seedling comprising holding two plates so that their lower edges are in mutual contact and form a cutting edge, moving the plates simultaneously downwards to penetrate the surface of the ground with the cutting edge, opening the lower edges of the plates to form an excavation in the ground by rotating each plate about an axis which is stationary with respect to a line of travel, positioning a seedling between the plates in the excavation, raising the plates in their separated conformation to move them clear of the ground, closing the excavation around the roots of the seedling, wherein the seedling is supported in the excavation by holding means while the plates are raised and while the excavation is closed and is subsequently released and in which the stationary axis is substantially parallel to the ground surface and to the line of mutual contact of the lower edges of the plates so that each plate is substantially perpendicular to the ground surface when in the separated conformation.

2. A process according to claim 1 in which there is a space defined between the plates above the cutting edge and a seedling is placed in that space before the downward movement of the plates and is held in the space during the downward movement.

3. A process according to claim 1 in which the excavation is closed by injecting material into the excavation.

4. A process according to claim 3 in which the fill is injected as the plates are removed.

5. A process according to claim 3 in which the fill is injected after the plates have been lifted clear of the ground.

6. A process according to claim 3 in which the injected material is dry particulate matter, a paste or a slurry.

7. A process according to claim 1 in which the excavation is closed by inserting a pair of blades into the ground on opposite sides of the seedling and spaced from the seedling at a greater distance than the edge of the excavation formed by the plates and then moving the lower edges of the blades simultaneously towards the plant.

8. A process according to claim 1 in which the seedlings include tree seedlings.

9. A process according to claim 8 in which the tree seedlings are root seedlings.

10. A process according to claim 1 in which the excavation is closed by injecting material from an injection means provided on the inner surface of at least one of the plates into the excavation.

11. A planting device suitable for spot planting seedlings comprising a pair of plates capable of being supported to form a cutting edge by holding their lower edges in mutual contact, means for moving the plates downwards so that the cutting edge penetrates the ground, means for moving the plates apart to separate the lower edges to form an excavation in the ground, means for moving the plates upwards clear of the ground with the plates in their separated conformation and closing means for closing the excavation, wherein the means for moving opens the lower edges of the plates by rotating each plate about a stationary axis which is substantially parallel to the ground surface and to the line of mutual contact of the lower edges of the plates so that each plate is substantially perpendicular to the ground surface when in the separated coformation, and also seedling holding means which are capable of holding the seedling in position in the excavation between the plates while the plates are moved upwards relative to the seedling and the ground and while the closing means operate to close the excavation around the roots of the seedling.

12. A device according to claim 11 in which the holding means are capable of holding the seedling in a space defined between the plates above the cutting edge during the downward movement of the plates and penetration of the ground.

13. A device according to claim 11 in which the said closing means comprise fill injection means arranged so as to be be capable of injecting fill material into the excavation.

14. A device according to claim 13 in which said closing means are provided on the inner surface of at least one plate.

15. A device according to claim 11 in which said closing means comprise blade means which are capable of being held apart at a distance greater than the separation of the edges of the excavation and of being moved downwards to penetrate the ground on opposite sides of the excavation and the device comprises means for moving the blades simultaneously towards the excavation to close it.

16. A device according to claim 13 in which said fill injection means comprises means to inject dry particulate, paste or slurry matter into the excavation.

17. A device according to claim 11 mounted on a vehicle capable of moving intermittently between planting sites and stopping at the required planting site and wherein said device is capable of planting seedlings whilst the vehicle is stationary.

18. A device according to claim 17 in which the vehicle is a stepping vehicle.

19. A device according to claim 17 in which the holding means are capable of holding the seedling in a space defined between the plates above the cutting edge during the downward movement of the plates and penetration of the ground.

20. A device according to claim 17 in which said closing means comprise blade means which are capable of being held apart at a distance greater than the separation of the edges of the excavation and of being moved downwards to penetrate the ground on opposite sides of the excavation and the device comprises means for moving the blades simultaneously towards the excavation to close it.

* * * * *